United States Patent [19]

Hirata

[11] 3,735,098

[45] May 22, 1973

[54] RECORDING MEDIUM FEED SYSTEM FOR READER OF DATA PROCESSING EQUIPMENT

[75] Inventor: Shinichi Hirata, Kohoku-ku, Yokohama, Japan

[73] Assignee: Kabushiki Kaisha Ricoh, Tokyo, Japan

[22] Filed: Aug. 9, 1971

[21] Appl. No.: 170,090

[52] U.S. Cl. ............................235/61.11 R, 178/17 B

[51] Int. Cl. ....G06k 17/00, G11b 15/52, H04l 15/24

[58] Field of Search ................235/61.11 R, 61.11 A, 235/61.11 C, 61.11 D; 178/17 B, 17 D; 197/20; 250/219 R, 219 Q, 219 D, 219 DC, 219 FR

[56] References Cited

UNITED STATES PATENTS

| | | | |
|---|---|---|---|
| 3,541,307 | 11/1970 | Dirks | 235/61.11 R |
| 3,248,030 | 4/1966 | Ganzhorn | 235/61.11 R |
| 3,573,437 | 4/1971 | Scuitto et al. | 235/61.11 R |
| 3,624,358 | 11/1971 | Bevis | 235/61.11 R |

*Primary Examiner*—Daryl W. Cook
*Attorney*—Burgess, Ryan and Wayne

[57] ABSTRACT

The feed of a recording medium is initiated by a drive means which is energized in response to a first readout instruction signal from a master such as a punch typewriter or electronic computer. Upon completion of transmission of one character data, a sync signal is mechanically generated and is compared with a second readout instruction signal from the master in a timing control circuit. When the sync signal is generated prior to the second readout instruction signal, the drive means is de-energized in response to the sync signal to thereby stop the recording medium and is again energized in response to the second readout instruction signal to thereby again initiate the feed. When the second readout instruction signal is generated prior to the sync signal, the drive means is kept energized even when the sync signal is generated so as to continue the feed of recording medium. The above cyclic operation is repeated in response to the succeeding readout instruction signals.

10 Claims, 6 Drawing Figures

RECORDING MEDIUM FEED SYSTEM FOR READER OF DATA PROCESSING EQUIPMENT

BACKGROUND OF THE INVENTION

Cross-reference to the related application:

The present invention represents an improvement over the invention entitled "Escapement for card or tape reader," by Noboru MURAYAMA, Shinichi HIRATA and Kinichi YOSHIKAWA, APPLICATION Ser. No. 851,331, filed on Aug. 19, 1969 now U.S. Pat. No. 3,610,495.

Field of the Invention:

The present invention relates to generally a reader such as a punched tape or card reader of data processing equipment and more particularly a recording medium feed system for use with a reader such as a punched tape or card reader of data processing equipment for intermittently or continuously feeding the recording medium such as punched tape or card depending upon the data processing speed of a master unit, such as a punch typewriter or electronic computer connected to the reader.

When a punched tape or card reader is connected to data processing equipment such as a punch typewriter or punches operating at relatively low speeds, the so-called intermittent feed type readers are widely used so that the punched tape or card may be fed or advanced one-data-column by one-data-column. In general, a magnet incorporated in the reader is energized only during a predetermined time interval in response to a readout instruction signal transmitted from a master unit so as to feed or advance the recording medium, whereby the next data column may be brought to the read position and stopped. The same cyclic operation may be repeated every time when the readout instruction signal is transmitted.

In the intermittent feed type readers of the type described, however, when the magnet actuating time as well as other mechanically actuating time are taken into consideration, it is seen that a spacing in time of readout instruction signals is limited to (rise time of magnet) + (release time) + (safety margin)

and that it is impossible to minimize the spacing to be less than the summation of the above three time intervals or parameters. Thus it is seen that the intermittent feed type readers of the type described have a distinct defect that the readout speeds are inevitably limited to the above three time parameters so that the readout speed is essentially slow. This defect is not serious when the readers are connected to punch typewriters which operate at low speeds. However, when the readers are connected directly to an electronic computers whose data processing speed is much faster than punch typewriters, the serious problem of "idle time" arises. However, this problem will be minimized when the continuous feed type readers in which a recording medium such as punched tape or card may be continuously fed or advanced are employed. However, there is a demand that a reader is frequently switched to a punch typewriter from a computer and vice versa, but it is not economical to provide individual readers, one being the intermittent feed type for a punch typewriter and the other being the continuous feed type for an electronic computer.

It is therefore the primary object of the present invention to provide an improved recording medium feed systems for readers of data processing equipment capable of feeding a recording medium such as a punched tape or card intermittently or continuously as needs demand.

SUMMARY OF THE INVENTION

In brief, the present invention provides an improved recording medium feed system characterized in that a readout instruction signal transmitted from a data processing equipment (to be referred to as "master" hereinafter in this specification for brevity) operatively connected to a reader is compared with a signal representing the completion of transmission of one character data readout and transmitted by the reader to the master, the signal being referred to as "mechanical synchronizing or sync signal" hereinafter, in such a way that when the mechanical sync signal is generated prior to the readout instruction signal, the reader is so actuated as to intermittently feed a recording medium whereas the mechanical sync signal is generated later than the arrival of the readout instruction signal, the reader is so actuated as to continuously feed the recording medium.

According to one aspect of the present invention, a reader comprises a timing control circuit for comparing in time the arrival of the readout instruction signal from the master with the arrival of the mechanical sync signal so as to generate first and second signals, a drive circuit means to be energized in response to said first signal from the timing control circuit, a magnet hold circuit means to be energized or set by the drive circuit means and de-energized or reset in response to the second signal from the timing control circuit, a magnet whose energization is initiated by the output current from the drive circuit means and is maintained by the magnet hold circuit means, and a mechanism adapted to feed a recording medium only when the magnet is kept energized. In response to a first readout instruction signal from the matter, the first control signal is generated by the timing control circuit so that the drive circuit means is first actuated and then the magnet hold circuit means is actuated, whereby the feed of recording medium is initiated and continued. Thereafter when the mechanical sync signal is generated prior to the arrival of a second readout instruction signal from the master, the timing control circuit generates the second control signal so as to reset the magnet hold circuit means, whereby the feed of recording medium is stopped. Upon arrival of the second readout instruction signal from the master, the feed of recording medium is resumed. Thus as far as the relation in time between the readout instruction signal and the mechanical sync signal is maintained as described above, the reader intermittently feeds the recording medium. On the other hand, when the relationship in time between the readout instruction signal and the mechanical sync signal is such that the next readout instruction signal arrives prior to the generation of the mechanical sync signal, the second control signal is not generated from the timing control circuit so that the magnet is held energized. As a consequence the feed of the recording medium is continued. Thus as far as the relationship in time between the instruction and the mechanical sync signal is maintained as described above, the reader continuously feeds the recording medium without interruption.

According to another aspect of the present invention, since the magnet may be maintained energized with a current smaller than the current required for initiating the energization of the magnet, the magnitude of the output current from the magnet hold circuit means is selected low than that of the output current from the drive circuit means.

Other objects and features of the present invention will become more apparent from the following description of the preferred embodiment thereof taken in conjunction with the accompanying drawing.

Figure 1:
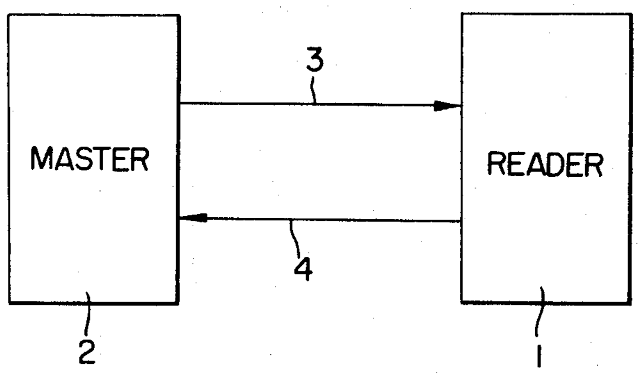
FIG. 1 is a block diagram illustrating the connection between a reader and a master.

DESCRIPTION OF THE PREFERRED EMBODIMENT:

Referring to FIG. 1, a reader 1 such as a punched tape or card reader in a data processing equipment is connected through a pair of output lines 3 and 4 to a master 2 such as the output of a computer. It is assumed that the reader 1 is of the type in which a punched tape or card is intermittently fed, whereas the master 2 is a punch typewriter. Upon application of the read instruction signal to the reader 1 from the master 2 through the line 3, the reader transmits to the master 2 through the line 4 the data of one character or one character data while the recording medium or punched tape or card is advanced by one data column, that is, the next data column is advanced to the read position and is stopped. During this stage, the master 2 processes the transmitted data and upon completion thereof the next read instruction signal is transmitted to the reader 1. However, when the master 2 or punch typewriter has a lower processing speed, the next readout instruction signal is generated and transmitted to the reader 1 only after the reader 1 has already advanced the recording medium or punched tape or card by one data column. In other words, the master 2 is still processing the transmitted data even when the reader 1 has advanced the recording medium, that is the next data column to the readout position. As a consequence the master has no idle time at all.

On the other hand when the reader 1 of the type in which the recording medium or punched tape or card is intermittently advanced to the readout position is connected to the master 2 which is now an electronic computer whose data processing speed is much faster than that of the punch typewriter, the data processing conditions are completely changed. That is, before the reader 1 can advance the recording medium to the readout position after it has transmitted the one character data to the master, the next readout instruction signal is generated and transmitted to the reader 1 from the master. However, as far as the recording medium is transmitted intermittently or step-by-step in the reader 1, no data will be transmitted to the master 2 unless the next data column of the recording medium is advanced and stopped at the readout position. As a consequence it is clear that the master 2 now has idle time.

It is therefore the primary object of the present invention to minimize this idle time of the master 2 by advancing or feeding the recording medium such as punched tape or card not only intermittently but continuously or at high speed.

Figure 2:
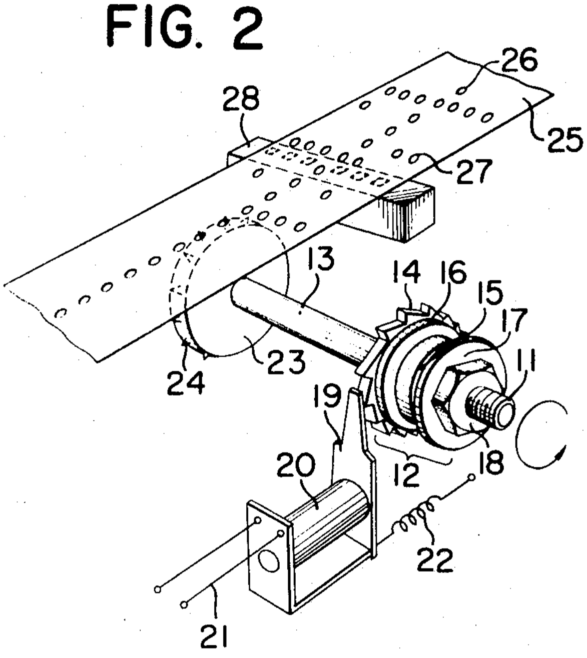
FIG. 2 is a perspective view of one example of a recording medium feed mechanism employed in the preferred embodiment of the present invention.

FIG. 2 illustrates one embodiment of a recording medium feed mechanism for a reader of the type in which a recording medium is not only intermittently but continuously fed or advanced. A drive shaft 11 directly coupled to a motor (not shown) is coupled through a friction clutch 12 to a driven shaft 13 carrying a ratchet wheel 14. In this embodiment the friction clutch 12 comprises a friction spring 15 carried by the drive shaft 11, a friction disk 16 which is pressed against the ratchet wheel 14 under the force of the spring 15 and a lock nut 18 which retains the spring 15 in position through a washer 17. A stopper 19 which is an armature of a magnet 20 is in engagement with the teeth of the ratchet wheel 14. More particularly when the magnet 20 is energized by the current applied to a pair of input terminals 21, it attracts the stopper 19, thereby disengaging it from the ratchet wheel 14. On the other hand, when the magnet 20 is de-energized, the stopper 19 engages the ratchet wheel 14 under the force of a bias spring 22. A sprocket wheel 23 is carried by the driven shaft 13 and the teeth of the sprocket wheel 24 with a series of feed holes 26 of a recording medium 25 which is shown as a punched tape in this embodiment. A series of photoelectric elements generally indicated by 28 are disposed below the path of the recording medium 25 for reading out the data from each of the data columns of the recording medium.

When no readout instruction signal is applied and no current is applied to the magnet 22 so that it remains de-energized, it is seen that the stopper 19 engages the teeth of the ratchet wheel 14 so that the rotation of the drive shaft 11 will not be transmitted to the driven shaft 13. As a consequence neither of the driven shaft 13 and the sprocket wheel 23 are rotated so that the recording medium is not advanced. When the readout instruction signal is applied, the current is applied to the magnet 20 through its input terminals 21 to thereby energize the magnet 20 to attract the stopper 19 toward it. As a result the stopper 19 disengages from the ratchet wheel 14 so that the rotation of the drive shaft 11 is transmitted to the driven shaft 13 through the friction clutch 12. As a consequence, the sprocket wheel 24 carried by the driven shaft 13 is rotated whereby the recording medium 25 is advanced. Upon interruption of the supply of the current to the magnet 20, the stopper 19 is released and engages the ratchet wheel 14 again, whereby the recording medium 25 is stopped. In this case, a time interval for supplying the current to the input terminals 21 and hence to the magnet 20 is so selected that the recording medium 25 is advanced by one data column, that is the next data column is advanced to the readout position of the photoelectric effect elements 28 while the magnet 20 is being energized. The above described cyclic operation is repeated whenever the readout instruction signal is applied to the reader, whereby the recording medium 25 is intermittently advanced or fed. The recording medium feed mechanism described above with reference to FIG. 2 is employed in the system in accordance with the present invention to be described in more detail hereinafter with reference to FIG. 3.

Figure 3:
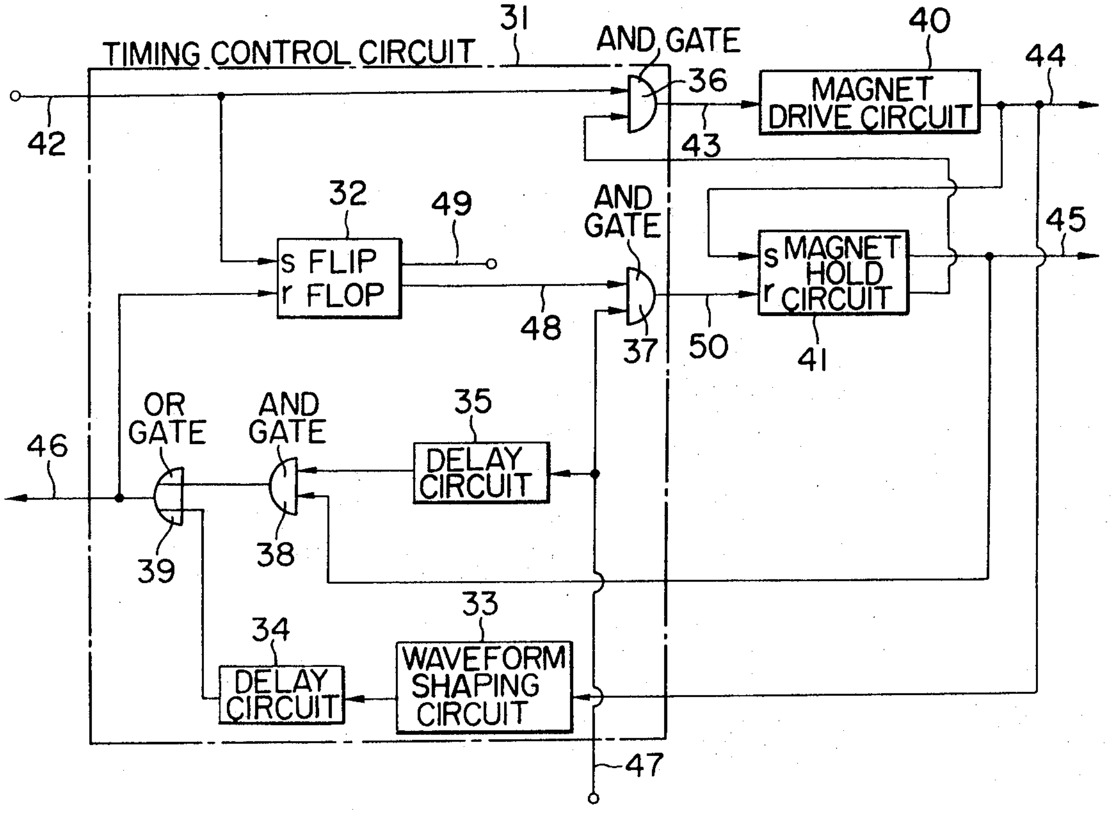
FIG. 3 is a circuit diagram of the preferred embodiment of a recording medium feed system in accordance with the present invention.

Referring to FIG. 3, a block 31 surrounded by the chain line is a timing control circuit for discriminating the relation in time between the readout instruction signal transmitted from the master (not shown) and the mechanical sync signal transmitted from the feed mechanism shown in FIG. 2 representing the completion of transmission of one character data as will be described in more detail hereinafter. The timing control circuit 31 includes a flip-flop 32, a pulse waveform shaping circuit 33, delay circuits 34 and 35, AND gates 36, 37 and 38 and an OR gate 39. Reference numeral 40 designates a magnet drive circuit comprising a monostable multivibrator; 41, a magnet hold circuit comprising a flip-flop; and 44 and 45, output lines.

Figure 4A:
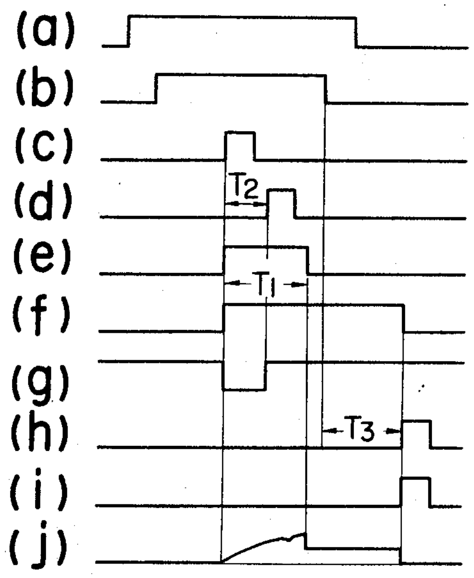
FIG. 4 comprising waveforms 4*a* and 4*b* is a time chart for explanation of the mode of operation of the circuit shown in FIG. 3.
Figure 4B:
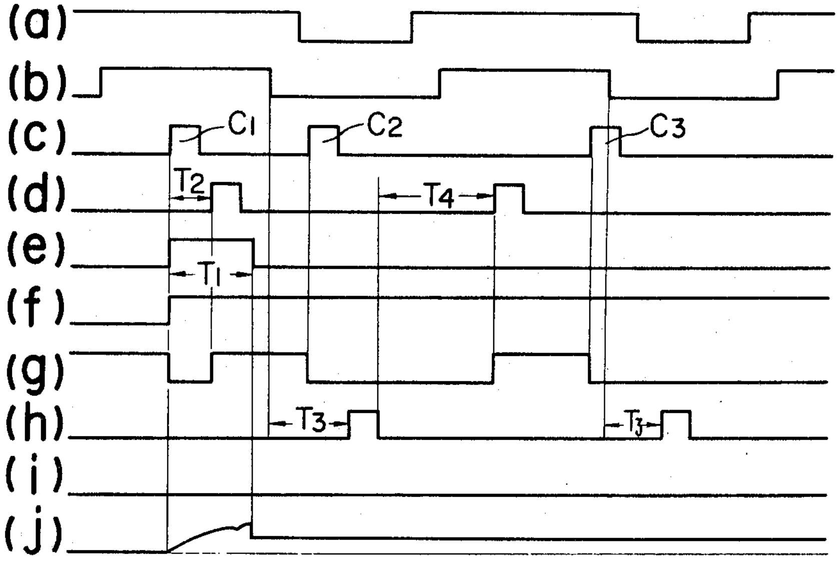

FIG.4A shows various waveforms for explanation of the mode of operation of the circuit shown in FIG. 3 when the recording medium 25 is intermittently advanced while FIG.4B shows such waveforms when the recording medium is continuously advanced. FIG.4–*a* indicates the data column position of the recording medium 25 (See FIG. 2); FIG. 4–*b*, the position of the feeding hole; FIG.4–*c*, the readout instruction signal; FIG. 4–*d*, a signal representing the completion of readout to be referred to "readout end" signal hereinafter; FIG.4–*e*, an output signal from the drive circuit 40; FIG.4–*f*, a set output signal from the set output terminal of the hold circuit 41; FIG.4–*g*, a reset output signal from the reset output terminal of the flip-flop 32; FIG.4–*h*, the mechanical sync signal described above; FIG. 4–*i*, an output signal from the AND gate 37; and FIG.4–*j*, the current waveform of the current supplied to the magnet 20 (See FIG. 2).

Now the mode of operation of the circuit shown in FIG. 3 will be described in more detail with reference to the time charts shown in FIG. 4.

INTERMITTENT OPERATION, FIG.4A

It is assumed that the character data in each data column will be readout when the recording medium 25 is held stationary at the readout position. In other words, the data is readout when the timing channel hole is in alignment with the photoelectric effect element 28 (See FIG. 2). It is also assumed that under the above condition the flip-flops 32 and 41 are reset. When the readout instruction signal is transmitted from the master through the output line 42 to the reader (See FIG.-4A–*c*), the AND gate 36 is turned on and the timing control circuit 31 supplies a first control signal on the output line 42. The readout instruction signal is also applied to the set input terminal of the flip-flop 32 to thereby set the same. In response to the first control signal, the drive circuit or monostable multivibrator 40 is energized or triggered so that the output current appears on the line 44 during time $T_1$ which is determined depending upon the time constant of the monostable multivibrator 40. This output current is fed to the set input terminal of the hold circuit or flip-flop 41 to thereby set the same so that the set output current appears on the output line 45 (See FIG.4A–*f*). The output lines 44 and 45 are connected to the input terminals 21 of the magnet 20 shown in FIG. 2 so that the magnet 20 is driven or energized by the current supplied through the output line 44 and is kept driven or energized by the current supplied through the output line 45 even when the current on the output line 44 disappears. Thus the feed of the recording medium 25 is initiated and continued. During this time, the data readout from the recording medium when the latter is held in the stationary position is being transmitted to the master (a circuit for transmitting the data to the master being not shown), and the readout-end signal is generated in combination with the signal on the line 44. That is, the signal on the line 44 is applied to the pulse waveform shaping circuit 33 which detects the leading edge of the pulse and shapes it. The output from the shaping circuit 33 is delayed by $T_2$ by the delay circuit 34 and transmitted to the master as the readout-end signal (See FIG.4A–*d*) through the OR gate 39 and the line 46. Upon reception of the readout-end signal, the master is set to the mode capable of generating the next readout signal, which is not immediately transmitted to the reader when the master is the punch typewriter whose data processing speed is slow. The readout-end signal is also applied to the reset input terminal of the flip-flop 32 to reset the same.

When the trailing edge of the feed hole is detected as the recording medium is advanced, the mechanical sync signal is supplied to the line 47 after a time delay $T_3$. Since the flip-flop 32 is reset as described above, the reset output signal is supplied to the line 48 (See FIG.4A–*g*). In this case, the set output line 49 of the flip-flop 32 is not used. As a result, in response to the sync signal on the line 47, the AND gate 37 is turned on so that a second control signal is transmitted to the line 50 (See FIG.4A–*i*). The second control signal is applied to the reset input terminal of the flip-flop 41 to reset the same so that the output current on the line 45 disappears (See FIG.4A–*f*). As a consequence, the magnet is now de-energized. After a predetermined time elapsed, the recording medium is stopped. By selecting a suitable time interval $T_3$, it is feasible to locate the center of the next feed hole in alignment with that of the photoelectric effect element 28. The above cyclic operation is repeated everytime when the readout instruction is generated.

CONTINUOUS OPERATION, FIG.4B

In response to the readout signal $c_1$ supplied on the line 42 from the master (See FIG.4B–*c*), the output current is supplied through the line 44 to the magnet to thereby energize it whereby the feed of the recording medium is initiated. In response to the current on the line 44, the flip-flop 41 is set and the current is supplied through the line 45 to the magnet to thereby keep it energized whereby the feed of the recording medium is continued. Furthermore in response to the readout instruction signal $c_1$, the flip-flop 32 is reset. The data trailed by a readout-end signal are transmitted from the reader to the master and the flip-flop 32 is again set (See FIGS.4B–*d* and –*g*).

When the master is an electronic computer whose data processing speed is very high, the next readout signal $c_2$ is immediately transmitted (See FIG.4B–*c*) from the master which is set to the mode of capable of transmitting the readout signal in response to the reception of the readout-end signal. Therefore, in some cases the mechanical sync signal is not present on the line 47 even when the next readout instruction signal $c_2$ has arrived at the line 42. Therefore, the flip-flop 41 remains set (See FIG.4B–*f*) whereas the AND gate remains OFF. As a consequence, even when the next readout signal $c_2$ appears on the line 42, the drive circuit 40 is not driven (See FIGS.4B–*c* and –*e*). In addition, the flip-flop 32 is set in response to the next readout signal $c_2$ (FIG.4B–*g*).

Upon detection of the trailing edge of the feed hole as the recording medium is advanced, the sync signal appears on the line 47 after the time delay $T_3$ (FIG.4B–*h*). However, the flip-flop 32 has been set in response to the next readout instruction signal $c_2$ so that the AND gate 37 cannot be turned on in response to the mechanical sync signal. As a consequence the second control signal does not appear on the line 50 (FIG.4B–*i*). Therefore the hold circuit 41 remains set and the magnet remains energized by the set output current on the line 45 (FIGS.4B–*f* and –*j*). As a result the recording medium continues to advance. When the feed hole is in alignment with the photoelectric effect element, the data in one data column are readout by the photoelectric effect elements and transmitted to the master, to which is also applied the readout-end signal from the line 46. In this case, the read-end signal is generated from the mechanical sync signal. That is, the mechanical sync signal on the line 47 is delayed by $T_4$ by the time delay circuit 35 and is transmitted on the line 46 through the AND gate 38 and the OR gate 39. In response to this readout-end signal, the master transmits the next readout instruction signal $c_3$ on the line 42. Thus, the above cyclic operation is repeated. That is, the flip-flop 41 remains set until the readout instruction signal arrives prior to the generation of the mechanical sync signal, so that the magnet remains energized and the recording medium continues to advance.

Figure 5:
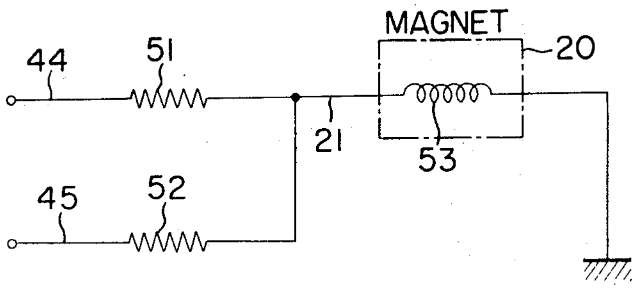
FIG. 5 is a circuit diagram of a magnet energizing current supply circuit.

Referring to FIG. 5, the output lines 44 and 45 shown in FIG. 3 are connected to one of the terminals 21 of the magnet coil 53 of the magnet 20 through resistors 51 and 52 respectively. As described above, the magnet 20 is energized by the current supplied thereto from the line 44 and is kept energized by the current supplied thereto from the line 45. Since the magnet may be kept energized by a small amount of current after the magnet is once energized, that is the current required for keeping the magnet energized may be smaller than the current to initiate the energization of the magnet, the current flowing through the line 45 may be smaller than the current flowing through the line 44. Therefore, the magnitude of the resistor 52 is greater than that of the resistor 51. Thus the current flows through the coil 53 as shown in FIG.4B–*j*. It is of course possible to maintain both of the currents at the same level. In this case, the drive circuit 40 in FIG. 3 may be eliminated.

What is claimed is:

1. A recording medium feed system in readers of data processing equipment having a master unit and a reader unit connected together and character data carried on a recording medium in said reader unit, said system comprising means for comparing the time when a first readout instruction signal arrives from said master with the time when a sync signal arrives from said reader, said sync signal being generated upon completion of transmission of one set of character data from said reader to said master, means for intermittently advancing said recording medium when said sync signal arrives prior to the arrival of said first readout instruction, and means for continuously advancing said recording medium when said first readout instruction signal arrives prior to the arrival of said sync signal.

2. A recording medium feed system as set forth in claim 1, wherein said sync signal is mechanically generated by said reader.

3. A recording medium feed system as set forth in claim 2, comprising said drive means for feeding a recording medium, means for energizing said drive means in response to the arrival of said first readout instruction signal from said master, means for de-energizing said drive means in response to said mechanical sync signal, means for re-energizing said drive means in response to the arrival of a second readout instruction signal from said master, and means for maintaining said drive means energized when said mechanical sync signal is generated after the arrival of said second readout instruction signal from said master.

4. A recording medium feed system as set forth in claim 3, comprising means for mechanically generating a mechanical sync signal representing the completion of transmission of one character data to said master, and wherein said means for comparing in time the arrival of the second readout instruction signal from said master with the arrival of the mechanical sync signal comprises a timing control for energizing said drive means in response to the mechanical sync signal when the mechanical sync signal arrives prior to the arrival of said second readout instruction signal and maintaining said drive means energized when the mechanical sync signal arrives later than said second readout instruction signal.

5. A recording medium feed system as set forth in claim 4, wherein said reader is capable of reading out data recorded upon a recording medium and transmitting the readout data to said master, said reader comprising a. said drive means to be energized during a predetermined time in response to the arrival of the readout instruction signal from said master for initiating the feeding of said recording medium, b. hold means energized by said drive means for holding the feed of said recording medium after said drive means is de-energized, c. said means for mechanically generating a mechanical sync signal representing the completion of transmission of one set of character data by said reader to said master, and d. said timing control means for comparing in time the arrival of the second readout instruction signal from said master with the mechanical sync signal for de-energizing said hold means in response to said mechanical sync signal and for energizing said drive means in response to said second readout instruction signal when said mechanical sync signal arrives prior to the arrival of said mechanical sync signal and not to energize said drive means in response to said second readout instruction signal and not to deenergize said hold means in response to said mechanical sync signal when second readout instruction signal arrives later than said mechanical sync signal.

6. A recording medium feed system as specified in claim 5, comprising a magnet wherein said drive means comprises a monostable multivibrator and said hold means comprises a flip-flop whereby said recording medium is fed when said magnet is energized by current from said monostable multivibrator or said flip-flop.

7. A recording medium feed system as specified in claim 6, wherein the readout instruction signal is generated by said master only after a signal representing the completion of readout by said reader is received, and said signal representing the completion of readout by said reader is generated as to delay the output signal from said drive means and said mechanical sync signal by a predetermined amount.

8. A recording medium feed system as specified in claim 6, wherein the output current from said flip-flop is lower in magnitude than that from said monostable multivibrator.

9. A method for driving a recording feed system in readers of data processing equipment having a master unit and a reader unit connected together, said method comprising generating a first readout instruction signal from said master, generating a sync signal by said reader unit upon completion of transmission of one set of character data from said reader to said master, comparing the time of generation of said first readout instruction signal and said sync signal, intermittently advancing a recording medium when said sync signal is generated prior to the generation of said first readout instruction signal, and continuously advancing said recording medium when said first readout instruction signal is generated prior to said sync signal.

10. A method for driving the recording medium feed system as set forth in claim 9, comprising energizing a drive means for feeding a recording medium in response to the arrival of said first readout instruction signal from a master, de-energizing said drive means in response to said mechanical sync signal, re-energizing said drive means in response to the arrival of a second readout instruction signal from said master, and maintaining said drive means energized when said mechanical signal is generated after the arrival of said second readout instruction signal from said master.

* * * * *